Sept. 3, 1968   E. M. BURGER   3,400,030
METHOD AND APPARATUS FOR BUTT-SPLICING
ELONGATED ELASTOMERIC ARTICLES
Filed Oct. 23, 1965   2 Sheets-Sheet 1

INVENTOR.
EDWIN M. BURGER
BY
Owen, Wickersham & Erickson
ATTYS.

Sept. 3, 1968  E. M. BURGER  3,400,030
METHOD AND APPARATUS FOR BUTT-SPLICING
ELONGATED ELASTOMERIC ARTICLES
Filed Oct. 23, 1965  2 Sheets-Sheet 2

INVENTOR.
EDWIN M. BURGER
BY
Owen Wickersham & Erickson
ATTYS

United States Patent Office 3,400,030
Patented Sept. 3, 1968

3,400,030
METHOD AND APPARATUS FOR BUTT-SPLICING ELONGATED ELASTOMERIC ARTICLES
Edwin M. Burger, Walnut Creek, Calif., assignor to Oliver Tire & Rubber Company, Oakland, Calif., a corporation of California
Filed Oct. 23, 1965, Ser. No. 502,858
15 Claims. (Cl. 156—153)

ABSTRACT OF THE DISCLOSURE

A method and apparatus for butt-splicing vulcanized elastomeric articles in which the end portions of the articles are compressed and deformed and an end portion of each is removed while under stress so that when the end portions are bonded together the gasket will have a joint with residual internal stresses which strengthen the joint.

---

This invention relates to an improved method for butt-splicing elongated articles of rubber and also to the apparatus for carrying out the method.

Rubber ring type sealing gaskets such as those used in sealing the joints of bell and spigot pipe are today manufactured in generally two different ways. For the smaller sizes (e.g., 4″ to 6″ in diameter) the gaskets may be molded in the complete ring form. However, for larger gasket sizes it is desirable to extrude or mold the gasket material in long sections and then cut these sections to the desired length and splice their ends together to form the circular gaskets. Prior to the present invention the splicing methods employed proved to be inadequate. Primarily they produced splices which lacked the necessary strength and durability particularly necessary in gaskets which must often be stretched considerably and also rolled during their installation into sealing position on pipe joints. Moreover, the methods heretofore applied often produced splices which looked poor with the connected end members being offset or misaligned. The failure of many splices by prior art methods was due to excessive tension stresses that were present in the gasket particularly near its outer surface. It is known that rubber under tension tends to break down and disintegrate, and thus the presence of continuous tension stresses at the surface of a gasket splice causes an increased rate of deterioration and eventually a failure of the gasket.

One general object of the present invention is to provide an improved method for butt-splicing elongated rubber articles such as gasket material that overcomes the aforesaid problem and consistently produces splices having an unusual strength and durability and with a precision that assures consistent results with splices having a good appearance with no misalignment and full contact and welding of end surfaces.

A more specific object of my invention is to provide an improved method for butt-splicing elongated rubber articles which provides a splice wherein the elastomeric material at and near the surface is under residual compression. This is an extremely important feature of my invention since it reduces or eliminates entirely any tension stresses which may subsequently be applied at the surface of the gasket around the splice after it has been installed. Such tension stresses as mentioned previously are a large factor in reducing the life expectancy and hence the reliability of gaskets heretofore spliced under conventional methods.

Another object of the present invention is to provide a method for butt-splicing elongated rubber articles wherein the articles are abutted, bonded and welded or vulcanized while under stress, and residual stresses are provided in the finished products when the force exerted during splicing is removed.

A further object of my invention is to provide a method for butt-splicing elongated rubber articles which makes possible a high degree of precision in the preparation of absolutely smooth planar bonding surfaces on the ends to be joined and the application thereon of a uniform layer of uncured bonding material which is partially dried when applied so that the curing time required for the splice is reduced to a minimum.

Yet another object of the present invention is to provide a butt-splicing method for vulcanized rubber articles that is particularly adaptable for producing a large number of highly reliable and durable splices at one time and yet requires a minimum of time and labor to carry out.

Still another object is to provide an apparatus for carrying out my butt-splicing method, which is economical and easy to operate with a minimum of unskilled labor.

Other objects, advantages and features of my invention will become apparent from the following detailed description taken with the drawings, in which.

Figure 1:
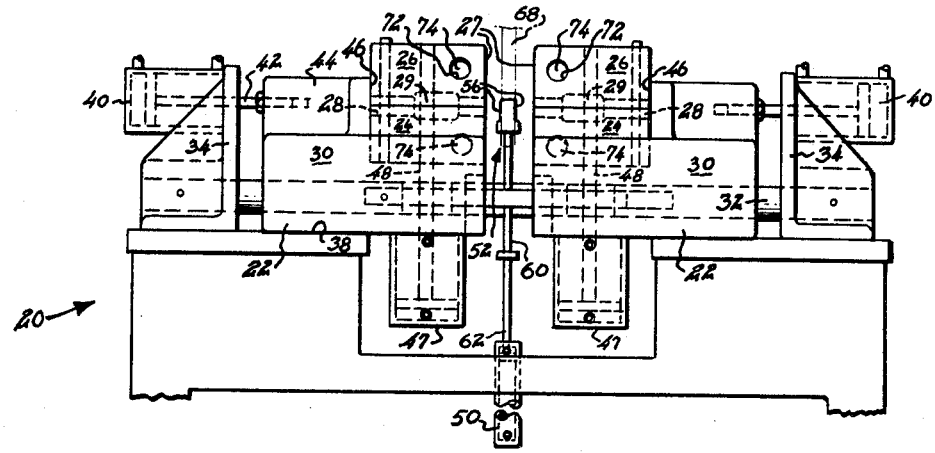
FIG. 1 is a view in side elevation of a butt-splicing apparatus embodying the principles of the invention.
Figure 2:
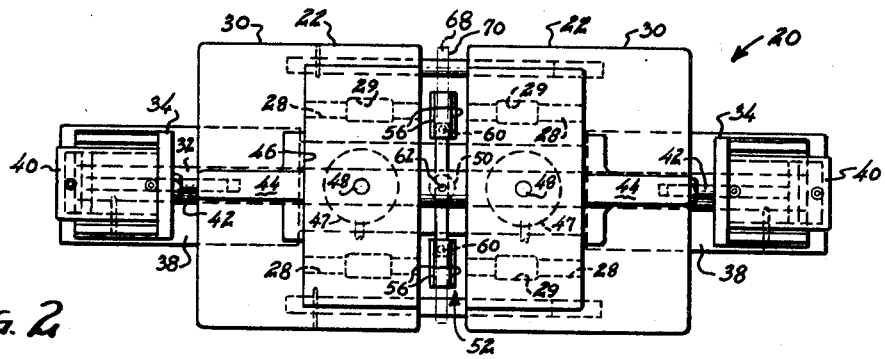
FIG. 2 is a plan view of the apparatus of FIG. 1.
Figure 3:
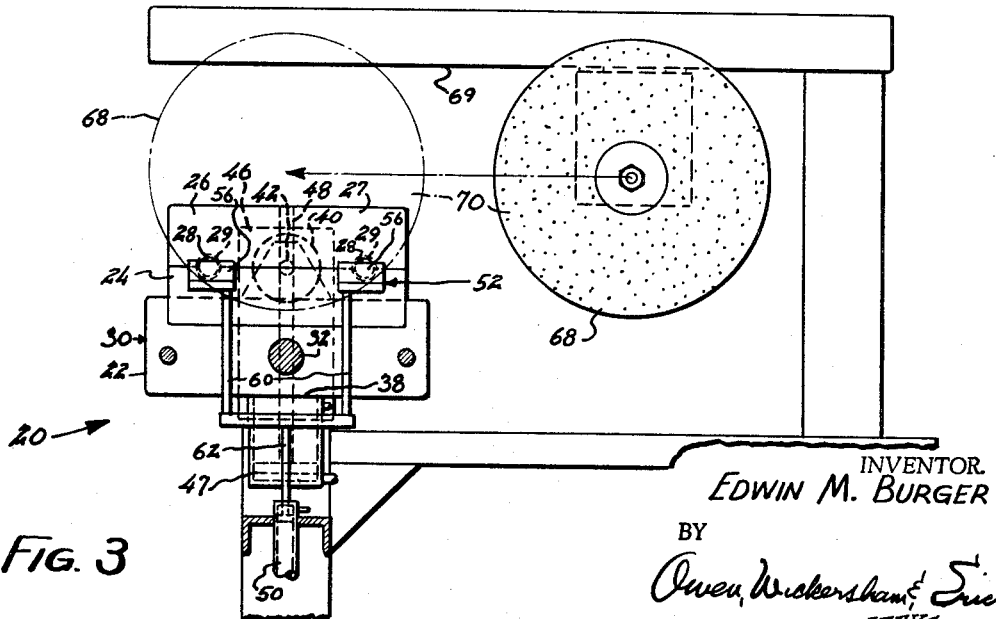
FIG. 3 is a view in section taken along the line 3—3 of FIG. 2.

With reference to the drawings, FIGS. 1–3 show an apparatus 20 for butt-splicing elongated rubber articles by the method according to the present invention. Both my method and apparatus 20 are applicable for butt-splicing a wide variety of rubber articles having elongated portions of uniform cross sections. Thus, although the drawings show the splicing of one form of material having a circular cross section it will be apparent from the description which follows that the invention is equally applicable for splicing material having other cross sections. The splicing apparatus 20 comprises two movable clamping jaw assemblies 22, 22 which are identical in structure and function. Each jaw assembly 22 is comprised of a lower jaw member 24 and a vertically movable upper jaw member 26. On the engaging faces of both pairs of upper and lower jaw members are a plurality of matching pairs of die cavities 28, 28 within which the articles to be spliced are secured or clamped. Inwardly from the vertical faces 27 of the jaw members, each die cavity preferably has a relieved area 29 of a slightly larger cross section. This causes the clamping force to be concentrated at a smaller area adjacent these vertical faces. As shown in FIG. 2, provision is made in the apparatus 20 for splicing two joints at one time, but by merely enlarging the jaw members and providing more pairs of cavities it is obvious that a greater number of splices could easily be made.

Each of the lower jaw members 24 is fixed on a horizontally movable support member 30 and both of these support members are mounted on a horizontal guide bar 32. The latter is secured at both ends to a pair of fixed support members 34, 34 that are firmly secured to a bench or support 36 for the apparatus. In addition to being slidably mounted on the guide bar 32, each movable support member also may slide along and therefore be at least partially supported on an upper surface 38 of the support bench. Mounted on each fixed support member 34 is an actuator 40 for producing a horizontal force to move a jaw assembly 22. This actuator may be a pneumatically or hydraulically operated cylinder, as shown, or some other actuator for producing a ram force could be used such as a motor driven jackscrew. The piston rod 42 of each actuator 40 is connected to an upright portion 44 situated on one end of the upper side of the movable support member 24. This latter portion on each jaw assembly provides a vertical guide or supporting surface 46 adjacent the movable upper jaw member 26. Thus it is seen that the actuators 40 which are controlled by conventional means such as a valve in a supply line of fluid under pressure (not shown) are adapted to move both jaw assemblies 22, 22 on the guide bar 32 to position them horizontally and to push them towards each other with any force desired within the limits of the power available.

The upper jaw member 26 on each jaw assembly 22 is movable with respect to the lower jaw member 24 by means of an actuator 47 fixed to the underside of the lower jaw member. Here, each piston rod 48 of an actuator 47 extends upward through the center of the lower jaw and is secured in the upper jaw by a suitable locking nut. Again, the actuators 47 are controllable as to their force and displacement by conventional means, so that the upper jaws can be brought downwardly against the lower jaws with their cavities 28, 28 in register while exerting the desired pressure. Yet, they can be raised to separate the jaws so that articles to be spliced can be easily inserted or removed.

Located centrally between the fixed supports 34, 34 and below the lower jaw members 24, 24 is an actuator 50 for controlling a spacer device 52. The latter has an inverted T shape in cross section with a central portion 54 providing opposite parallel walls 56, 56 and lower flange portions 58, 58 that extend outwardly from these walls. The spacer device is movable vertically by means of a link 60 connected to the actuator piston 62, as shown in FIG. 3, so that it can be positioned directly in line with the openings 64, 64 formed by the die cavities 28 on the inner vertical faces 27, 27 of the mating jaw members. When the spacer is positioned in the aforesaid manner and with the jaw assemblies 22 also located at a predetermined location, the articles to be spliced can be placed into their respective cavities with end portions extending beyond the faces 27, 27 and abutting the walls 56, 56 of the spacer device. When the jaws are clamped together on the articles the spacer device is removed by actuating the piston 62 downwardly.

The width of the spacer central portion 54 is greater than the thickness of a buffing wheel 68 which is another component of the apparatus 20. In the arrangement shown in FIG. 3, the buffing wheel, which may be driven by an electric motor (not shown), is movable on a pair of horizontal rails 69 to a precise position centrally between the closed jaw assemblies 22 in which are clamped the articles to be spliced. This buffing wheel has opposite parallel sides 70, 70 of abrasive material particularly adapted for use on elastomeric materials. When in the aforesaid position, the jaw assemblies 22, 22 are movable horizontally by their actuators 40 so that the extending end portions of the clamped articles which are bulging outwardly due to temperature and pressure, can be buffed off until smooth flat, parallel surfaces are formed.

In each of the lower and upper jaw members 24 and 26 is a transverse bore 72 lying above and near the ends of the die cavities 28. Within each of these bores is an electrical heating unit 74 which supplies heat to the articles being spliced during the entire splicing operation. These heating units 74 may be any of conventional type which are commercially available and are therefore not shown in detail. I have found that the location of the heaters, as shown, provides a very efficient transfer of heat by conduction through the jaw members and makes it easy to maintain the articles being spliced at the desired temperature for proper curing level.

Figure 4:
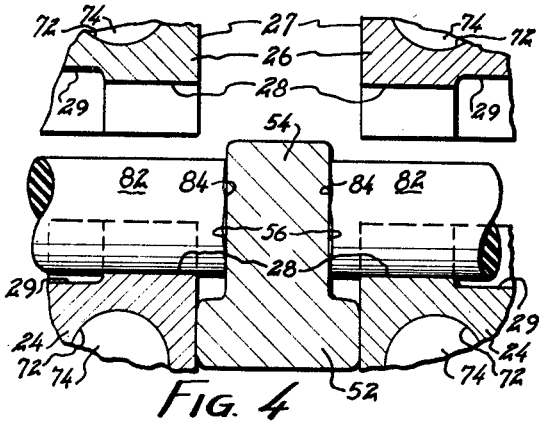
FIGS. 4–8 are enlarged fragmentary views showing the various steps of the butt-splicing method according to the present invention.

The operation of the apparatus 20 will be easily understood from the following description of my novel method for butt-splicing elongated rubber or elastomeric articles according to the present invention, which method is shown in its several steps in FIGS. 4–9. In FIG. 4, the end portions of two pieces of rubber material to be spliced, designated by the numerals 82, 82 are first placed within the die cavities 28, 28 of the respective lower jaw members 24, 24. If the splice being made is to form a circular gasket, the overall circumferential dimension of the end product is important. Therefore, after an elongated piece of material is cut to the proper length the end portions must be positioned axially within the lower jaws with precision so that only a minimum of material is removed in making the splice. This proper positioning is accomplished by use of the spacer 52 which extends between the pairs of clamping jaws. This spacer provides a pair of parallel walls perpendicular to the axis of the members to be spliced against which the unusually rough ends 84 of the end portions 82 to be spliced can be brought to bear when they are placed between the clamping jaws. When the end portions are thus positioned, the spacer 52 is removed from its position between the clamping jaws and extreme end portions 86 of substantially equal length which extend beyond their inner faces 27. Both pairs of jaws are now closed together.

Figure 5:
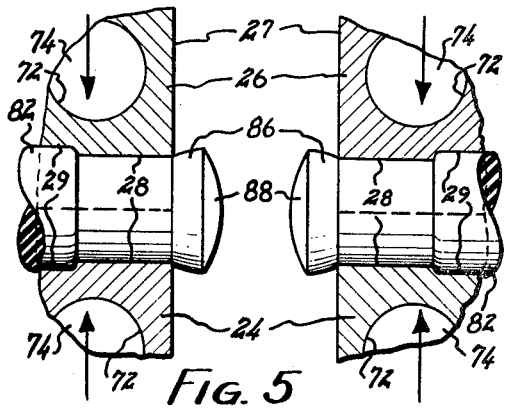

As shown in FIG. 5, when this next step takes place, the end portions 82 are placed under a clamping pressure which causes the extreme unconfined end portions 86 projecting from each pair of closed jaws to become distorted in shape and a convex portion 88 from each end surface is caused to bulge outwardly therefrom. As a preliminary step to the clamping of the end portions, heat is supplied to the jaw members and thus to the members being spliced. This heat at around 300°F. is maintained throughout the splicing procedure and also contributes in some measure to the distortion of the extreme end portions 86 and the formation of the bulging portions 88.

Figure 6:
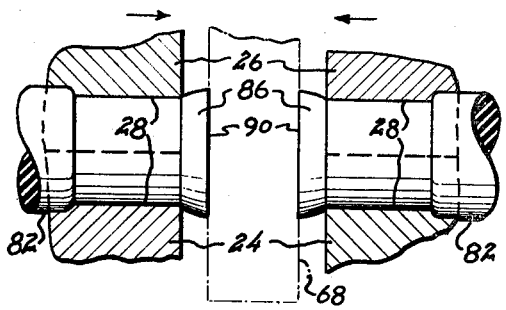

The amount of clamping pressure applied may very according to the size, shape and modulus of elasticity of the material being spliced as well as other factors. For achieving the results desired according to the principles of the invention it is necessary that the clamping force combined with the heat applied be sufficient to cause the formation of the bulging convex portions 88. The amount of bulge produced can also vary the results, but I have found that for a ¾″ cylindrical rubber member, a bulge of from $\frac{1}{32}''$ to $\frac{1}{16}''$ at the center produces good results in the finished splice. With the clamping pressure being maintained the next step of my method is to remove the bulging extreme end portions 88. As shown in FIG. 6 this may be accomplished by placing a rotating buffing wheel such as the wheel 68 having parallel abrasive sides between the jaws. The clamped jaws are then moved horizontally at an equal rate against the buffing wheel so that the convex end portions 88 of the members 82 being spliced are provided with smooth, parallel end surfaces 90.

Figure 7:
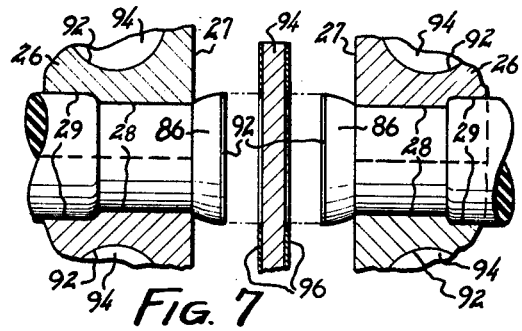

FIG. 7 shows the next step of my method which entails the application of a layer 92 of elastomeric bonding adhesive to the previously buffed end surfaces 90. Any conventional uncured or unvulcanized rubber bonding material can be used, and it could be applied in the well-known manner with a brush or the like. However, such bonding materials are generally in a liquid form and contain a large percentage of solvent which provides the vehicle for the rubber compound. When applied with conventional applicators the solvent immediately permeates the end portions of the rubber being spliced. Before the coated end portions can be joined the layers of adhesive must dry and be free of solvent. If not, a good bond will not result and internal blisters can form due to gaseous expansion of the solvent during the curing cycle. The present method overcomes this problem by utilizing a metal paddle 94 preferably thinner than the buffing wheel 68 from which the elastomeric bonding material is transferred to the buffed ends 90 of the end portions 82. The paddle used is coated with a layer of polytetrafluorethylene plastic so that its adhesion to the bonding material is less than that of rubber. Thus, the paddle may be dipped in liquid bonding material which has a consistency such that a uniform layer 96 of the desired thickness (e.g., .003″) is formed on the coated paddle. The paddle is then placed between the clamped jaws, as shown in FIG. 7, and they are moved against it and retracted. In this simple movement the layer 92 of bonding material is transferred to the ends 90 of all the members being spliced. The important advantage of this transfer step is that when the bonding material is applied first to the plastic coated paddle, the solvent is allowed to escape more rapidly and most of it has evaporated by the time that the material has been transferred to the ends of the material being spliced. This is a very significant improvement in the splicing methods heretofore used because it greatly reduces the drying time required for bonding materials applied in the conventional manner, and it therefore speeds production.

Figure 8:
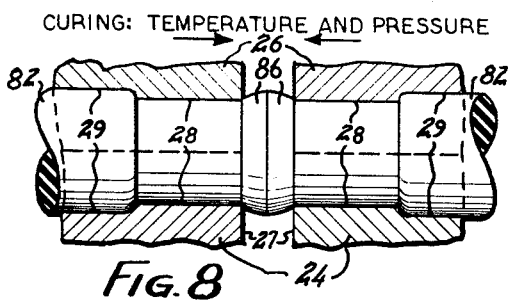
Figure 9:
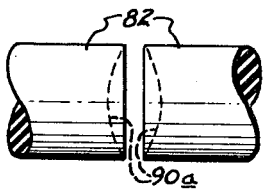
FIG. 9 is a view showing disconnected end portions which have been prepared for splicing as they would appear with the clamping force thereon removed.

FIG. 8 illustrates the final step of my method which calls for the jaws 24, 26 and thus the clamped end portions 82 of the members being spliced, to be moved axially together so that the buffed and adhesive coated end surfaces 90 are placed in contact with each other. At this stage a predetermined axial force producing a uniform curing pressure (e.g., 15–30 p.s.i.) is applied by the clamped horizontally, movable jaws. This axial pressure at the splice may vary depending on the articles being spliced and the bonding material being used, etc.

As stated above, when the end portions being spliced are initially placed between the clamping jaws, the latter become heated and they remain heated (e.g., 300°F.) during the entire splicing process. This heat and the curing pressure are maintained throughout a predetermined curing period which may also vary for different articles and various bonding materials (e.g., from 3 to 8 minutes).

Figure 11:
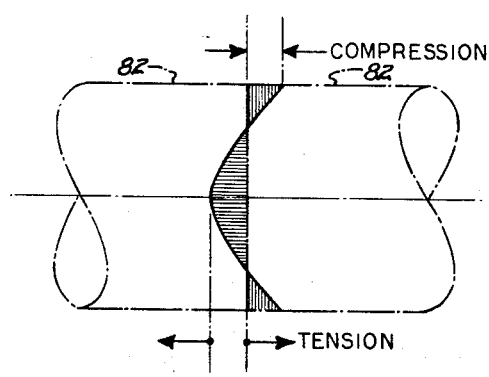
FIG. 11 is a diagram showing the internal residual stresses of a butt splice made according to my method.
Figure 10:
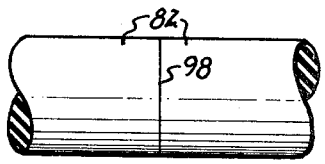
FIG. 10 is a fragmentary view which shows a completed butt splice made according to the method of FIGS. 4–8.

When the curing time with heat and pressure being applied has elapsed, the clamping jaws 24 and 26 are separated to facilitate removal of the spliced article. The completed splice which is produced by the aforesaid method, as shown in FIG. 10, is unusually precise, with a junction line of the joined members indicated by the numeral 98 often being hardly visible. However, the most important thing about the completed splice is presence of residual forces in the material at the splice which make it stronger and more durable than splices made by other methods. In the diagram of FIG. 11, tension and compression forces are shown relative to a cross section at the splice and define a substantially thick outer layer of the spliced material which is under residual compressive stresses, while tension stresses occur only at the center of the splice. These residual stresses are due to the fact that the extreme bulging end portions 88 of the members being spliced were removed when the end portions 82 were under compression. Thus, a greater amount of material was removed from the center of the end portions than near their edges. If after the end portions 82 were buffed smooth and then removed from the jaws and thus relieved of the compressive force on them, the internal elasticity of the material would cause the end surfaces to be concave, as shown at 90$^a$ in FIG. 9. However, this relieved condition is never reached because the end surfaces 90 are completely joined together when the end portions are still compressed. Now, when the spliced together section is removed from the clamping jaws it is apparent that residual tension forces exist internally within the spliced section due to the distorted but bonded material, and this tension force is a maximum along the central axis of the section, as shown in FIG. 11. The tension forces which are present at the center due to the complete bonding across the splice cause a reaction which produces the compressive forces around the outer periphery of the section in order to keep the section in equilibrium. Thus, for a substantial depth from the surface of the spliced section the residual forces are compressive. This unique characteristic of my splices is an important factor in providing their consistently high strength and durability. My method eliminates the tendency for the splices to separate, and even when the spliced section is placed under external tension, as in a gasket, the net tension forces on the surface of the article are relatively low. Since it is well known that most rubber products age slower and maintain their strength longer when surface tension forces are relatively low, the advantages of my butt-splicing method according to the present invention become readily apparent.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim:

1. An apparatus for splicing together the ends of elongated rubber articles comprising:
   a pair of jaw assemblies and means for moving said jaw assemblies horizontally towards or away from each other;
   each said jaw assembly including a pair of upper and lower jaw members, both having recesses for receiving the end portions of rubber articles to be spliced;
   means for closing each said pair of jaw members to apply a radially acting compressive force to each rubber end portion to be spliced so that the end face thereof is caused to bulge outwardly;
   abrading means for removing the bulged out part of each end portion and forming thereon smooth planar surfaces;
   and means for moving said pairs of jaws closer together along an axial line to engage said abrading means and thereafter for moving said smooth planar surfaces of said end portions into engagement after they have been coated with a bonding cement.

2. The apparatus as described in claim 1 wherein said abrading means for removing the bulged part of said end portions comprise a rotatable buffing wheel having parallel surfaces on opposite sides, said jaws and the articles held thereby being movable against said abrasive surfaces to form smooth planar surfaces.

3. An apparatus for splicing together the ends of elongated rubber articles comprising:
   a frame having a pair of fixed spaced apart supports thereon;
   first actuator means attached to each fixed support and having a horizontally movable piston;
   a guide means extending between said fixed supports;
   a pair of jaw supports including a lower jaw member, each being attached to a said movable piston and also movable along said guide means;
   an upper jaw member mounted on each said lower jaw member and movable vertically with respect thereto;
   said upper and lower jaw members on each said jaw support having matching cavities for receiving the rubber articles to be spliced;
   second actuator means on each said jaw support for closing each said pair of jaws to apply a compressive force on each rubber article to be spliced so that it becomes elastomerically distorted with its end face bulging outwardly;

abrading means for removing the bulged out end face portions of each article in the jaws and forming thereon smooth planar end face surfaces;

heater means in said jaw members for supplying heat to the articles retained thereby when said first actuator means move said jaw members horizontally and end face surfaces into engagement.

4. The apparatus as described in claim 3 including: a third actuator means disposed below said lower jaw members and having an upwardly movable piston; and spacer means connected thereto and positionable temporarily between pairs of upper and lower jaw members for spacing them apart by a predetermined amount while spacing apart the ends of the articles to be spliced by a lesser predetermined amount.

5. The apparatus as described in claim 3 wherein said abrading means for removing the bulged out end face portions of the articles being spliced comprises a buffing wheel having parallel abrasive sides; and means for supporting said buffing wheel for movement into a predetermined position between said end face portions.

6. A method for butt splicing the end portions of elongated elastomeric articles comprising the steps of:

applying a radial compressive force to a pair of end portions of an article to be spliced together, said force being sufficient to elastomerically distort said end portions and cause their end faces to bulge outwardly;

removing the outwardly bulging end faces to form planar end surfaces on said end portions while maintaining said radial compressive force;

applying a coating of bonding material to said planar end surfaces:

placing the coated end surfaces into engagement under axial pressure and maintaining said axial pressure for a predetermined drying time;

and releasing the radial compressive force and axial pressure on said article end portions, whereby residual compressive forces are produced in the splice for a substantial depth inwardly from the surface of the spliced section.

7. A method for butt splicing the end portions of elongated rubber articles comprising the steps of:

placing of articles to be spliced between two opposed pairs of clamping members;

applying sufficient radial compressive force and heat to the end portions of the articles being spliced to cause the end faces of said end portions to bulge outwardly;

abrading the outwardly bulging end faces until planar end surfaces are formed on said end portions;

applying a coating of uncured elastomeric material to said planar end surfaces;

placing the coated planar end surfaces into engagement under axial pressure while maintaining the heat thereon;

and releasing the radial compressive force as well as the axial pressure on said article end portions, whereby residual compressive forces are produced in the splice for a substantial depth inwardly from the surface of the spliced section.

8. The method of claim 7 wherein the heat applied during engagement of the coated surfaces is maintained at around 300° F.

9. The method of claim 7 wherein the axial pressure applied during the engagement of the articles being spliced is in the range of 15 to 30 p.s.i.

10. A method for butt splicing the ends of elongated elastomeric articles comprising the steps of:

placing the end portions of articles to be spliced between opposed pairs of clamping members;

applying a radial compressive force with said clamping members to the aligned end portions of articles to be spliced together, said force being sufficient to elastically deform the articles and cause their end faces to bulge outwardly;

abrading the outwardly bulging end faces until planar end surfaces are formed on said end portions while the radial compressive force is maintained;

applying a coating of uncured elastomeric material in a uniform layer to said planar end surfaces;

placing the coated end surfaces into engagement under axial pressure while applying a constant heat thereto for a predetermined curing period;

and releasing the radial compressive force as well as axial pressure on said article end portions, whereby residual compressive forces are produced in the splice for a substantial depth inwardly from the surface of the spliced section.

11. The method as described in claim 10 wherein the application of the elastomeric material is accomplished by transferring a partially dried layer of elastomeric material from a paddle having a surface with less adhesive force on the elastomeric material than the ends of the articles to be spliced.

12. The method as described in claim 10 wherein the application of the elastomeric material is accomplished by placing a paddle previously coated with a layer of partially dried elastomeric material between said pairs of clamping members; moving said clamping members and the end portions held thereby horizontally until the end surfaces engage said paddle; and then retracting said end portions to transfer portions of the elastomeric bonding material from said paddle to the end surfaces.

13. A method for butt splicing the end portions of elongated elastomeric articles comprising the steps of:

placing the end portions of articles to be spliced between pairs of clamping members with some of the end portions extending beyond the inner faces of the clamping members;

applying a radial compressive force to the aligned end portions of articles to be spliced together, said force being sufficient to cause the extending end portions to distort and form outwardly bulged convex tip portions;

buffing the outwardly bulging tip portions and forming planar end surfaces on said end portions;

applying a coating of uncured elastomeric material to said planar end surfaces;

placing said coated end surfaces into engagement and applying pressure along a line substantially perpendicular to the plane of the engaged surfaces;

applying heat to said coated end surfaces while they are engaged for a predetermined curing period;

and releasing the compressive force on said gasket end portions, whereby residual compressive forces are produced in the splice for a substantial depth inwardly from the surface of the spliced section.

14. A method for butt splicing the end portions of elongated rubber articles comprising the steps of:

placing the end portions of articles to be connected in axial alignment between pairs of clamping jaws with extreme end portions of the articles extending outwardly from the clamping members;

applying a radial compressive force to the aligned end portions of articles to be spliced together, said force being sufficient to cause end faces of the extending end portions to bulge outwardly;

abrading the outwardly bulging end faces to form planar end surfaces on said end portions;

applying a coating of unvulcanized elastomeric material to said planar end surfaces;

placing said coated end surfaces into engagement;

applying heat and axial pressure simultaneously to said engaged end surfaces for predetermined curing period;

and releasing the compressive force on said gasket end portions when said curing period has finished.

15. The apparatus as described in claim 1 wherein each said pair of upper and lower jaw members comprises means forming a die cavity terminating at the faces of the jaw members and an adjacent relieved cavity next to said die cavity of a greater cross section for receiving a displaced portion of the article end portion when the jaw members are closed.

References Cited

UNITED STATES PATENTS

| 2,273,464 | 2/1942 | Campbell et al. | 156—258 XR |
| 2,281,976 | 5/1942 | Hansen | 156—258 XR |
| 2,647,555 | 8/1953 | Hinman | 156—258 XR |

EARL M. BERGERT, *Primary Examiner.*

M. L. KATZ, *Assistant Examiner.*